Patented June 1, 1926.

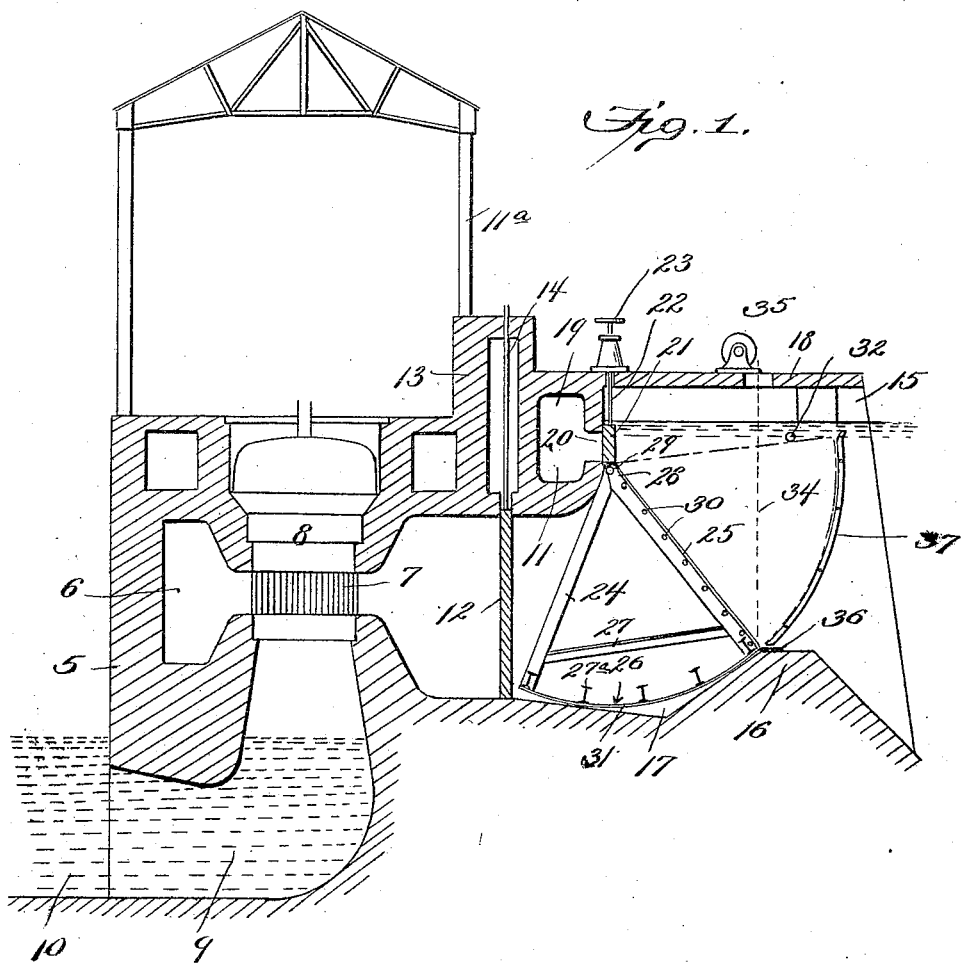

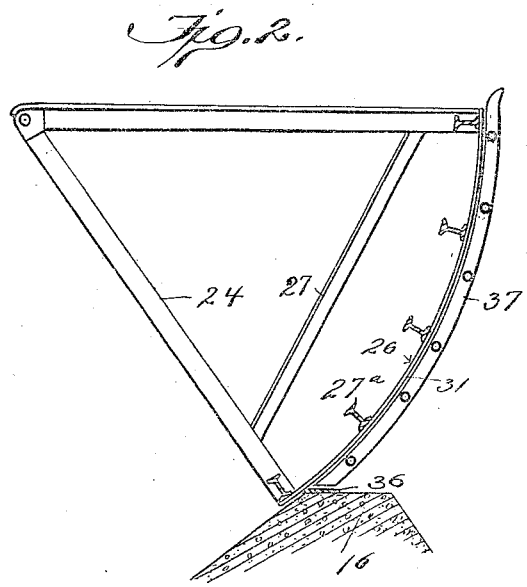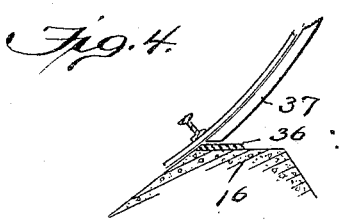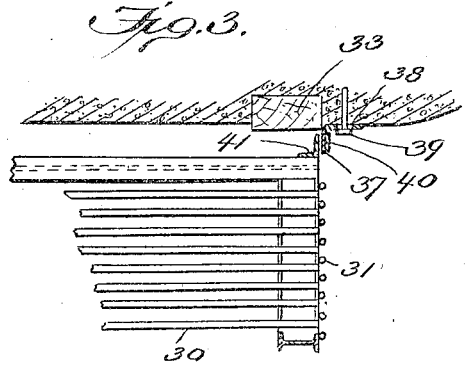

1,586,754

UNITED STATES PATENT OFFICE.

JAMES A. LEONARD, OF LEWISTON, MAINE, ASSIGNOR TO S. MORGAN SMITH COMPANY, OF YORK, PENNSYLVANIA, A CORPORATION OF PENNSYLVANIA.

DOUBLE RACK FOR WATER SUPPLY.

Application filed March 23, 1925. Serial No. 17,729.

This invention relates to trash racks for water power plants, and the main object of the same is to prevent floating or waterlogged timber, ice, branches of trees and other débris from clogging the passages of water wheels or runners of turbines and other analogous installations.

The present invention is a development of that disclosed by my application executed of even date herewith, Serial No. 17,728.

The improvement in the present instance consists of a dual rack organization having a supporting framework and comprising a forward rack and a bottom rack, the whole organization diverging from an upper reduced extremity where it is pivoted to operate similarly to a radial gate, and whereby a rack will always be disposed crosswise and vertically with relation to a water supply or flume, both when the dual rack organization is in normal lowered position and when raised to automatically clean or relieve one of the racks from débris accumlations by the action of the water. The remaining rack will also be cleaned when moved by simple means and there will always thus be a water passage from the water supply or flume relatively to an intake opening into a turbine chamber. With the improved dual rack structure embodying the features of the present invention a head gate of any suitable form will be used and adapted to be opened to admit water to the turbine chamber and the wheel or runner, or be closed to exclude water from the wheel or runner during repairs or at other times when found necessary. The improved dual rack organization can be easily applied to and used in connection with existing plants which are already provided with head gates, and it will be understood that the main object of the invention is to provide two sets of racks so structurally arranged and operatively disposed that when one set is being cleaned the other set automatically comes into position to prevent the flow of trash or other débris into the turbine chamber or the wheel or runner, particularly when the head gate is opened, or when it is desired to clean one of the racks of each group without excluding water from and shutting down the wheel or runner of the turbine by the operation of the head gate. The improved dual rack structure could also be used as an intake or water supply for a mill or factory water-operated mechanism, either for condensing water or for mill supply, and in which use the racks or screens would be made up of smaller bars or rods in much closer spaced relation than in ordinary installations, or the bars or rods could be replaced by any other analogous structures that would permit the water to flow therethrough.

As in my companion application hereinbefore referred to the same advantages accrue in connection with the improved dual rack structure as in the rack and gate structure of said application relatively to preventing fixed ice or so-called anchor ice from interferring with the operation of the dual rack, in view of the fact that both racks are normally entirely submerged below the frost line, and this submergence of the parts of the racks in the water below the frost line will prevent ice from freezing to them, and as a consequence the ordinary troubles of anchor ice will be largely eliminated.

A preferred form of the improved dual rack organization is disclosed in the accompanying drawings, in which:—

Fig. 1 is a cross section through a turbine installation and the masonry incident thereto together with the intake therefor, showing the improved dual rack in transverse section in closed and raised positions respectively in full and dotted lines, and one means diagrammatically illustrated for controlling the movement of the combined device.

Fig. 2 is a side elevation of the improved dual rack organization shown raised so as to bring the normally lower rack upwardly into a flume or water supply and also illustrating the forward lower portion of the masonry or sill and a preferred form of cleaning rake in section.

Fig. 3 is a detail horizontal section showing a part of the masonry or concrete structure and means for mounting the dual rack and controlling the operation thereof through the medium of rails or guides, a part only of the dual rack being illustrated.

Fig. 4 is an enlarged transverse vertical section showing a part of the dual rack organization and masonry, to particularly illustrate a fixed rake for cleaning the normally bottom rack.

The numeral 5 designates masonry or concrete work, comprising a chamber or passage 6, which in the present instance is in the form of a scroll of well known type and serving as a means to supply the wheel or runner 7 of a vertically disposed turbine 8, which has the usual setting in the masonry or concrete structure. This masonry or concrete structure also has a draft tube 9 formed therein which discharges into a tailrace 10. On the masonry or concrete structure a super-structure or power house 11ª of any suitable form is adapted to be erected. The chamber or passage 6 is adapted to communicate with an intake 11, and between the latter and the said chamber or passage a head gate 12 is mounted to move or slide vertically in a part of the masonry or concrete structure above, any suitable means as 14 being employed to operate this gate. The intake 11 is located at the termination of a water supply or flume 15 of any well known or approved form, and at the base of the flume a suitable distance in advance of the intake the masonry or concrete is formed with an upward projection or sill 16, in rear of which is a depression or space 17 for a purpose which will be presently explained. Above the sill 16 the flume has a covering 18, and in advance of the means 14 for operating the head gate is a canal or passage 19 having a front inlet opening 20, which is controlled by a gate 21, raised and lowered through connections 22 and means 23 for operating the latter. By means of the canal or passage 19 water may be caused to flow from the upper part of the flume around the turbine installation, including the parts just specified, and downstream for cleaning purposes, or to relieve a rack structure, hereinafter explained, of an accumulation of trash, débris or other matter. The turbine installation including the masonry or concrete work, superstructure and the turbine as shown, are well known structural features in the art and form no part of the present invention and are capable of modification. This masonry or concrete work and superstructure together with the turbine as shown may be an equipment already installed and to which the features of the present improvement may be applied.

The essential features of the present invention consist of a dual rack organization comprising a rear open frame 24, of suitable construction, a front rack 25 and a lower or bottom rack 26 preferably of arcuate form though capable of modification in contour within the scope of the invention. The rear frame 24 and the two racks are suitably braced and strengthened and are composed of depending and cross beams 27 and 27ª of any suitable type and preferably of I-form, and this structure as a whole is essentially triangular in form, or diverges from an upper apex or reduced extremity 28 to the lower or bottom rack 26. At intervals this structure will be braced, as at 27, and the details of arrangement of the beams or the components of the frame 24 and the two racks 25 and 26 are not essential and are capable of a wide range of variations, the principal object being to render the entire structure strong and durable. The combined structure, or the frame 24 and racks 25 and 26, operates similarly to a radial gate, this unitary structure being pivoted or fulcrumed at its upper apex or reduced extremity 28, as at 29, adjacent to the opening or inlet 20 to the canal or passage 19. The racks 25 and 26 will be composed of rods or bars 30 and 31 suitably spaced, or wire gauze of proper mesh may be substituted for the rods. The rods or bars will be crossed or reinforced and may be suitably secured to the beams 26 and 27 in any preferred manner. At a suitable elevation in advance of the pivotal mounting of the unitary dual rack organization, including the frame 24, a rod 32 extends outwardly from the sides of the flume 15, and in the adjacent part of the flume sides upright studs 33 are adapted to be imbedded in the masonry or concrete work, as particularly shown by Fig. 3. The dual rack organization and the frame 24 as a unit may be raised and lowered by a cable or analogous device 34 connected to the bottom portion of the front rack 25 and operated by a motor hoist 35 mounted on the covering 18. However, instead of this particular means for raising and lowering the dual rack structure and frame as a unit, the well known float organization may be employed having an automatic operation well understood by those skilled in this art.

On the top of the sill 16 and having its rear edge projecting a sufficient distance therefrom is a fixed rake 36 for engaging the lower rack 26 and cleaning the latter as it moves upwardly in an arcuate path. The unitary structure including the racks 25 and 26 and the frame 24 is also guided in its radial arcuate movement by flanged tracks, rails or guards 37 secured on opposite sides of the flume close to the upright studs or posts 33, as clearly shown by Fig. 3, these tracks, rails or guards being of a curved form corresponding to the arc of movement of the unitary device and preferably of L-shape with inwardly projecting flanges constructed with a plurality of openings or slots 38 engaged by adjusting bolts or pins 39, which extend into the masonry or concrete and whereby the said tracks, rails or guards may be moved inwardly towards, or outwardly from, the improved unitary device and especially the rack 26. On the rear sides of the inwardly projecting flanges of the tracks, rails or guards 37 is a covering of rubber or other analogous material 40, which cooperates with angle flanges 41 secured to the opposite sides of the rack 26. The tracks, rails or guards 37 are adjustable to allow for irregularities in the rack 26 and also provide close joints at the points where they are located, to prevent the passage of any débris or other accumulation that would be free to pass to the turbine installation if the said tracks, rails or guards were not used.

The operation of the improved combined or unitary racks and frame is very simple. When it is desired to clean the rack 25, it is raised or elevated to the position shown in dotted lines in Fig. 1 and in full lines in Fig. 2 by the cable or analogous device 34 and motor-operated hoist 35, or automatically by any well known type of float construction, the said rack 26 being limited in its upward movement by engaging the rod 32. When the rack 25 is thus raised the rack 26 is elevated in the flume and provides a screen which prevents the flow of trash, débris and other accumulations into the intake and chamber of the turbine, and during the downward movement of the racks, the normally lower rack 26 is cleaned of débris or trash that may have accumulated thereon during its elevation by engagement with the fixed rake 36. After the rack 25 has been raised, the gate 21 is opened and the water flows over the top of the said rack 25 through the inlet 20 into the canal or passage 19 and at the same time washes all débris or other accumulations from the rack 25, the débris or other accumulations passing through the canal or passage 19 around the turbine installation and downstream. During this operation or the elevation of the racks 25 and 26 and the frame 24, the head gate 12 may be closed or remain open as desired, it being obvious that when the said gate 12 is opened it will be unnecessary to shut down the turbine, the latter being allowed to continue to operate and the water supplied thereto will be liberated of all débris and other matter by the elevated normally lower rack 26. Subsequent to cleaning the rack 25 the gate 21 will be closed and the two racks 25 and 26 and frame as a unit will be lowered to normal position as shown in full lines by Fig. 1. This operation may be repeated as often as found necessary and will result in a great saving of time and labor in maintaining the racks in a cleanly condition as compared to the old methods of hand cleaning.

From the foregoing it will be understood that the essential feature of the present invention as distinguished from that of my companion application hereinbefore noted is the embodiment in a radially operating structure of two racks which are operable to be alternately disposed in positions for preventing the passage of trash, débris and other accumulations into the intake and supply chamber of a turbine installation. It should be further understood that the improved double rack is adapted to be used in connection with any form of turbine installation to which it may be applicable, and, as hereinbefore indicated, it is proposed to use the improved structure in connection with the intake or water supply for a mill or factory or other water-operated mechanism. The rods or bars comprised in the rack structure may be of any suitable dimensions and cross sectional configuration.

It is obvious that changes in the proportions, dimensions and minor details of contruction may be made at will to adapt the improved structure to various installations without departing from the spirit or scope of the invention.

What is claimed as new is:

1. A device of the class specified comprising dual racks connected for unitary movement and operable for replacement one by the other.

2. A device of the class specified, consisting of dual racks connected for unitary movement and comprising a front rack and a lower rack operable for alternate replacement one by the other.

3. A device of the class specified, consisting of dual racks connected for unitary movement and one of arcuate form, the racks being operable to effect a replacement of one by the other.

4. The combination of a water power installation having a flume with an upper overflow means, a dual rack organization pivoted at the upper extremity thereof adjacent the overflow means and comprising a normal forward and a bottom rack operable for replacement of one by the other during cleaning of one of the racks the forward rack being elevatable to the overflow means to effect a cleaning of the said rack.

5. The combination of a water power installation having a flume with an upper overflow means, a dual rack organization consisting of two racks and a frame connected for unitary movement and pivotally attached at the upper extremity thereof adjacent the overflow means, the dual rack organization being of substantially triangular form and diverging towards the lower extremity thereof where the bottom rack is provided, the forward rack being elevatable into line with the overflow means for cleaning the said rack.

6. The combination of a water power plant having an upper water supply and a passage to carry a part of the water around the installation downstream, a dual rack organization including a frame pivotally connected at its upper extremity immediately below the upper passage and embodying a front rack and normal bottom rack, the racks and frame being connected for unitary radial movement to dispose one of the racks in an elevated position in line with the said passage for automatically cleaning the same and permit the matter removed therefrom to pass off through the passage.

7. The combination of a water power plant having a water supply flume and intake and an upper overflow passage, a dual rack organization comprising a front straight rack and a bottom curved rack operating as a unit which is pivotally connected at the upper extremity thereof to a part of the power plant immediately below said overflow passage for radial movement relatively to the intake to replace one rack by the other to bring the straight rack upwardly into line with the overflow passage for the purpose of automatically cleaning the straight rack, and fixed means at the base of the water supply for cleaning the outer side of the curved rack during movement of the latter.

8. The combination of a water power plant comprising water-operated mechanism, a water supply flume and intake, a head gate, a gate-controlled passage at the upper rear portion of the supply flume, and a dual rack organization comprising front straight and bottom curved racks secured for unitary movement and pivotally connected at the upper extremity thereof below and close to the gate-controlled passage for radial movement of the front rack relatively to the passage, the two racks being operable for replacement of one by the other during the automatic water cleaning of the front straight rack when the latter is raised.

9. A water power installation having water supply means and an intake, a rack organization comprising two racks connected for unitary radial movement relatively to the intake and the water supply means, one of the racks having flanged devices at opposite sides, and arcuate flanges adjustably mounted at opposite sides of the supply means for cooperation with the flanged devices at the sides of one of the racks, the said arcuate flanges having rear coverings to form water-tight joints and guiding means relatively to the sides of the rack carrying the flanges.

10. A water power plant having water supply means and an intake, a stop means extending across the upper portion of the supply means, and a dual rack organization mounted for radial movement relatively to the supply means and intake and adapted to engage the said stop means to limit the upward movement thereof, the one rack means being raised for automatic cleaning by water flowing through the supply means, and means for carrying off the matter cleaned from the elevated rack clear of the power plant.

In testimony whereof I have hereunto set my hand.

JAMES A. LEONARD.